Dec. 29, 1959
L. J. SIRI
2,918,931
AIR CHARGER FOR PRESSURIZED TANKS
Filed April 24, 1957
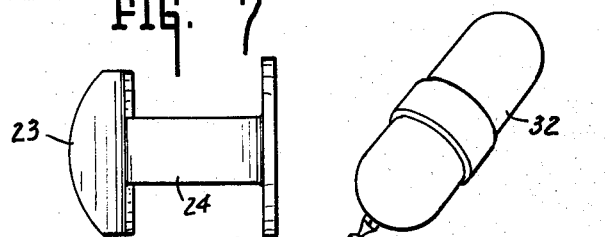
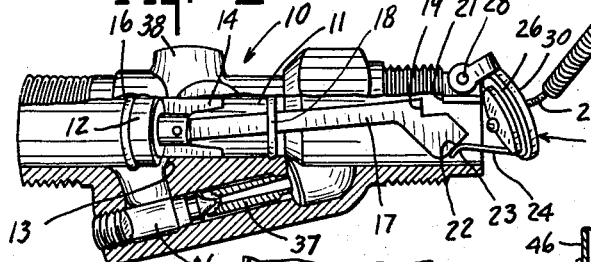
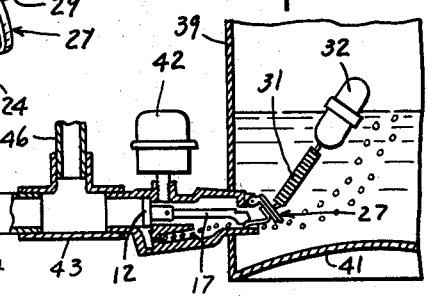
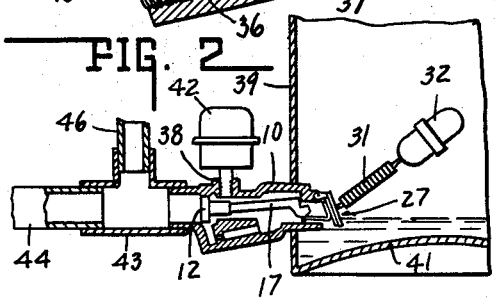
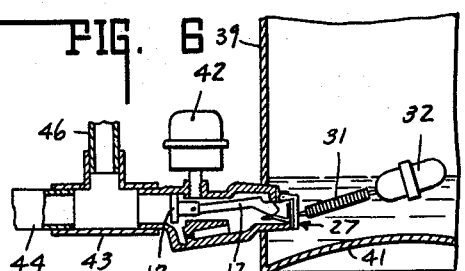
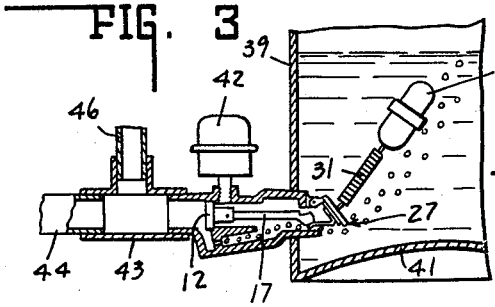
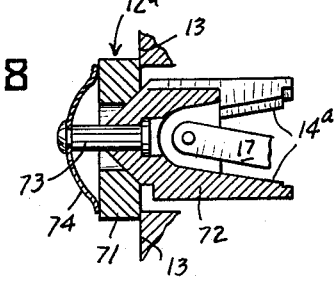
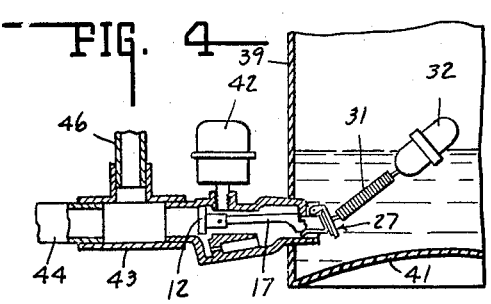
INVENTOR.
LOUIS J. SIRI.
BY
Maurice A. Weikart
ATTORNEY.

United States Patent Office 2,918,931
Patented Dec. 29, 1959

2,918,931

AIR CHARGER FOR PRESSURIZED TANKS

Louis J. Siri, South Bend, Ind., assignor to Penn Controls, Inc., Goshen, Ind., a corporation of Indiana Application April 24, 1957, Serial No. 654,844

7 Claims. (Cl. 137—211)

The present invention relates generally to air chargers for pressurized tanks and is particularly concerned with providing an improved assembly for maintaining the proper air charge in a water tank such as that used in domestic water systems.

In such systems, when water is pumped into an empty tank, the air which is in the tank at atmospheric pressure becomes compressed until the pump control cut-out setting is reached thereby causing the pump to stop. If this cut-out setting is assumed to be, for example, 40 pounds per square inch gage pressure, then the water in the tank will have risen to approximately 73% of the tank height when the pump is stopped. If the pump control cut-in setting is assumed to be 20 pounds per square inch gage pressure, then a tank withdrawal sufficient to lower the liquid level in the tank to approximately 58% of the tank height will be required to restart the pump.

Since the amount of water withdrawal that can be made between the cut-in and cut-out settings of the pump control is a direct function of the volume of air trapped in the tank above the liquid level, it is customary to provide the tank with an air volume control which provides for charging air into the tank in addition to that normally trapped therein and thus establishes a tank water level lower than 58% of the tank height at the assumed pressure switch cut-in point of 20 pounds per square inch.

One example of such an air charger control is that disclosed in Nash Patent 2,756,762. Since air charging apparatus of the Nash type must be located below the liquid level in the tank to prevent loss of the tank air charge, it is desirable to install the air charger as close to the bottom wall of the tank as possible thereby providing for a relatively large volume of air to be compressed above the liquid level in the tank. On an application to an existing tank, air charger controls of the Nash type provide greater "draw" capacity with less frequent pump operation. Applied to a tank designed to accommodate such an air charger control, equivalent draw capacity can be provided with a tank of greatly reduced volume as compared with a non-charged system.

The present invention provides an improved and simplified linkage between the valve and float in the Nash type of air charger assembly.

This improved arrangement is brought about by use of a poppet valve arm and a lift arm so shaped as to provide a camming action therebetween which assures that the safety check valve will always clear the poppet valve arm and can therefore close independently of the rate of withdrawal from the tank.

A further object is to provide an assembly of the type referred to above in which the poppet valve incorporates a relief valve, or by-pass valve, which prevents an objectionable build-up in pressure in the pump discharge line and the service line when the tank is being charged with air and permits liquid to enter the tank without entraining air whenever the liquid pressure exceeds a predetermined value.

A further object of the present invention is to provide an assembly which is rugged and relatively unsusceptible to damage in shipping and handling prior to installation within a tank.

These and other objects will become apparent as the description proceeds with reference to the accompanying drawings in which:

Figure 1 represents a cut-away side view of an assembly embodying the present invention.

Figure 2 is a schematic illustration of the apparatus of Figure 1 installed in a pressurized tank.

Figure 3 is a view similar to Figure 2 but showing the parts in differing relative position.

Figure 4 is a view similar to Figure 2 showing the parts in the positions assumed at a further point in the operational sequence.

Figure 5 is a view similar to Figure 2 illustrating a different point in the operational sequence.

Figure 6 is a view similar to Figure 2 illustrating the positions of the parts when the liquid level in the tank is at its ultimate low point.

Figure 7 is a front view of one component of the assembly shown in Figure 1.

Figure 8 is a sectional view of a modified form of a portion of the assembly shown in Figure 1.

Figure 9 is a front view of one of the components of the assembly shown in Figure 8.

Referring initially to Figure 1 the air charger assembly is seen to comprise an elongated housing 10 threaded at each end and having a central liquid passage 11 therethrough. Flow of liquid through the passage 11 is controlled by a poppet-type valve 12 adapted to co-operate with a valve seat 13. The main valve member 12 is formed with extending flanges 14 which guide the valve member 12 for reciprocation within the passage 11. A snap-ring 16, received in the housing 10, serves to establish the limit of lateral motion of valve member 12 away from seat 13. Pivotally connected to the valve member 12 is a valve arm 17 which extends through the passage 11 to a point adjacent the end thereof. The arm 17 extends between two positioning posts 18 (only one of which is shown in Figure 1) provided by a snap-ring appropriately placed within the housing 10. The free end of the arm 17 carries a notch 19 adapted to co-operate with an abutment 21 carried by the upper, inner face of the housing 10. The lower portion of the free end of arm 17 is formed so as to provide an inclined camming surface 22 which co-operates with an appropriately inclined camming surface formed on the head 23 of a lift arm 24. Lift arm 24 forms a part of a safety valve sub-assembly 27 which includes the lift arm, a disc of suitable valve-face material 26 and backing member 30.

Ears are formed adjacent the top of the member 30 which co-operate with a pivot pin 28 rigidly carried by an appropriate boss in the housing 10. Extending from the outer face of the safety valve assembly 27 is a rod 29 which is rigidly fastened to a helix spring 31 carrying at its outer end a float 32. The spring 31 is preferably formed so as to be pre-stressed; that is, formed so that in its free position a definite compressive force is exerted between the adjacent coils of the spring. With this arrangement it will be understood that the float is provided with a connection to the safety valve assembly which permits the float to be displaced out of its normal position, the resiliency of the spring returning the float to its normal position when the displacing force is removed.

The body 10 also accommodates a passage 36 which by-passes the valve 12 and its seat 13 and carries therein a venturi fitting 37 which has an appropriate opening to atmosphere (not shown) at its throat thus serving to entrain a relatively large quantity of air within the liquid passing through the passage 36. It will be understood that passage 36, because of the venturi fitting 37, offers relatively high resistance to the flow of liquid therethrough, and that, therefore, substantially no liquid, and consequently no entrained air, will flow through the passage 36 when the valve member 12 is opened, that is, spaced from its seat 13. A threaded opening through the housing 10, communicating with the passage 11, is provided at 38 to accommodate a convention pump control or pressure switch.

Referring now to Figures 2 through 6, the operation of the air charger assembly will be described. As may be seen in Figure 2, the air charger body 10 is threaded into an appropriate opening in a side wall 39 of a pressure tank, having a conventional crowned base well 41, at a point closely adjacent the bottom of the tank. A conventional pressure switch 42 is attached at the opening 38 and the other end of the housing 10 has threaded engagement with one end of a T fitting 43, the opposite end of which communicates with a pipe 44 which receives the discharge from a conventional liquid pump (not shown), controlled by switch 42 and adapted to supply water, or other liquid, under pressure. The upper opening of the fitting 43 is connected to a pipe 46 which provides the service outlet, in a domestic water supply system this service outlet being connected to the various faucets and other water consuming devices.

Upon initial installation of the apparatus as shown in Figure 2, the tank will be empty and the pressure in the system will be below the cut-in setting of the pressure switch 42 which will therefore cause the pump to operate to supply water through the passage 11 with the safety valve 27 held open by the water flowing through the passage 11. As the valve 27 moves toward open position, the lift arm 24 carried thereby will hold the valve arm notch in engagement with the abutment 21 locking main valve 12 in open position. Water will continue to be discharged directly into the tank until the pressure in the system reaches the cut-out setting of the pressure switch 42 which thereupon stops the pump. With the flow of water through the passage 11 having ceased upon stopping of the pump, and with the lift arm 24 withdrawn from under the valve arm 17 because of the high position of the float 32, the arm 17 will drop away from the abutment 21. Upon a subsequent withdrawal of water through the service pipe 46, if the withdrawal is sufficiently large, the pump will again be started and the initial movement of water through the passage 11 will close the valve 12 against its seat 13, as shown in Figure 3, forcing the flow of water through the by-pass passage 36, entraining air therewith, and thus carrying a relatively large amount of air into the tank. This air charging operation will take place with each cycle of the pump until sufficient air has been added to the tank to depress the water level to the point illustrated in Figure 4 which represents the normal operating water level in the tank. During these withdrawal and pumping cycles it will be understood that water may flow in either direction through the passage 11 depending upon the pressure within the system and the magnitude of the withdrawals. It will be further noted that as the lift arm 24 is moved from its position of Figure 3 into its position of Figure 4, the camming surface on the head 23 of the lift arm 24 will co-operate with the inclined surface 22 on the arm 17 so as to initially move the arm 17, and consequently the valve 12, leftwardly as viewed in Figure 3. Subsequently, as the head 23 traverses the lower portion of the surface 22, the arm 17 is raised into latching engagement with the abutment 21.

With the water level in the tank at normal position, indicated in Figure 4, subsequent on-cycles of the pump will discharge water directly into the tank. As air is lost from the tank by, for example, entrainment of air in water discharged from the tank during withdrawals, the water level in the tank will rise. The float 32 will thereupon be moved to its position of Figure 5 with the lift arm 24 being thereby positioned so as to permit the arm 17 to drop away from the abutment 21. With the start of the next on-cycle of the pump, the valve 12 will be moved against its seat 13 closing the passage 11 and causing water to flow through the venturi 37 adding air to the tank. This air charging operation will continue with each subsequent on-cycle of the pump until sufficient air has been added to the tank to bring the liquid level therein back to its normal position of Figure 4.

In the event of a power failure to the pump or if the volume of a withdrawal exceeds the pump delivery capacity, the water level in the tank will fall below the normal level and the float will, as may be seen in Figure 6, close the safety valve 27 to prevent the liquid from falling to the level of passage 11 and to thereby prevent the loss of the air charge within the tank. Upon subsequent termination of the excessive withdrawal, water will be discharged directly into the tank as pointed out with reference to Figure 2.

The camming action between the head 23 of the lift arm 24 and the surface 22 of the arm 17, wherein the arm is initially moved leftwardly as the float 32 drops, is particularly important in the case where, with a power failure to the pump, a continuous withdrawal occurs (such as that of a furnace humidifier or similar device). If this withdrawal is relatively small, the flow from the tank through passage 11 will be insufficient to move the valve 12, and consequently the arm 17, leftwardly out of the way of the lift arm as the safety valve 27 moves into its closed position of Figure 6. Without the lateral, cammed displacement of the valve arm 17 by the lift arm 24, some means, such as as a return spring acting on the valve member 12, would have to be provided to assure that the free end of valve arm 17 would not block the closing of safety valve 27 by interfering with the required movement of lift arm 24.

It will be particularly noted that the somewhat flexible connection between the float 32 and valve 27 provided by the prestressed coil spring 31 permits the opening in the tank receiving the air charger body 10 to be located closely adjacent the crowned bottom wall 41 of the tank. This is possible because, although the float mounting extends out of the safety valve assembly 27 at an angle to the longitudinal center line of the housing 10, the air charger housing may yet be rotatably threaded into the tank wall, the flexibility of the spring 31 permitting the float 32 to clear the bottom wall 41 of the tank as the body 10 is rotated into proper threaded engagement with the tank side wall 39. A further advantage is provided by the flexible connection between the float 32 and the valve 27 in that, before assembly of the air charger into a tank, any blows or rough treatment of the air charger in packing for shipment or other handling will not result in permanent deformation of the link between the float and the safety valve or other jamming of the parts interior to the air charger housing 10.

Referring to Figures 8 and 9, there is disclosed a modified form of the valve 12 designated 12a with rearwardly extending guiding members 14a, similar to flanges 14 in the valve 12 of Figure 1.

The valve 12a is formed of two parts, an annular member 71 and a plug member 72. The members 71 and 72 are held in engagement by a suitable pin 73 which is secured to member 72 and extends through a central opening in the member 71 and through an aligned opening in a spring washer 74. As may best be seen in Figure 9, the washer 74 has a plurality of legs which, at their extremities bear against the outer face of the member 71 and thus urge members 71 and 72 into engagement at their inclined inner faces. As shown in Figure 8 the valve 12a is closed tightly against valve seat 13, indicating that water is being forced through the venturi fitting 37 and an air charging cycle is in progress. Because of the resistance to water flow offered by the venturi fitting, the pressure in the pump discharge line 44 and the service line 46 will increase during an air charging cycle. Should the pressure differential existing across valve 12a caused by this pressure increase sufficiently, the force exerted by spring member 74 will be overcome to permit movement of the member 72 rightwardly (as viewed in Figure 8) away from the member 71. This movement permits water to flow through the axial opening in member 71, past the member 72 and into the tank through the central passage 11, thereby relieving the pressure upstream of the valve 12a. It will be understood that the movement of member 72, and consequently of arm 17, referred to above is not obstructed by either the lift arm 24 or the latching abutment 21 since, with valve 12a closed against seat 13, the arm 17 is free of abutment 21 and the arm 24 is held clear by the high position of the float 32.

The foregoing has described a preferred embodiment of the invention, other modifications may occur to those skilled in the art and it is to be understood that the scope of the present invention is to be limited only by the appended claims:

I claim:

1. An air charger assembly comprising an elongated housing having a central liquid passage therethrough and a poppet-type valve member controlling said passage, a by-pass passage around said valve member including means for injecting air into the liquid flowing through said by-pass passage, a valve arm pivotally mounted on said poppet valve, a latching abutment within said housing disposed at one side of said central liquid passage and adapted to cooperate with said arm to hold said poppet valve member in open position relative to said central liquid passage, a safety valve member mounted on said housing for closing both the central liquid passage and the by-pass passage, a lift arm carried by said safety valve member, co-operating camming surfaces on the valve arm and the lift arm to provide initial lateral movement of the valve arm for aligning it with said abutment and subsequent pivotal movement of the valve arm into latching engagement with said abutment as the safety valve moves toward closed position, and means for operating said safety valve comprising a float carried thereby.

2. An air charger assembly as claimed in claim 1 in which the poppet-type valve member includes means for opening said central passage in response to a predetermined liquid pressure differential across the poppet-type valve member.

3. An air charger assembly as claimed in claim 1 in which the safety valve member takes the form of a closure pivotally mounted at one end of the air charger body carrying the lift arm on its inner face and the float on its outer face.

4. An air charger assembly comprising, in combination, an elongated housing having a central liquid passage therethrough and a poppet-type valve member controlling said passage, a by-pass passage around said valve member including means for injecting air into the liquid flowing through said by-pass passage, a valve arm pivotally mounted on said poppet valve, a latching abutment within said housing disposed at one side of said central liquid passage and adapted to cooperate with said arm to hold said valve member in open position relative to said central liquid passage, safety valve means adapted to close both the central liquid passage and the by-pass passage, said safety valve means comprising a closure pivotally mounted at one end of the air charger housing, a lift arm carried on the inner face of said closure, cooperating camming surfaces on the valve arm and the lift arm to provide initial lateral movement of the valve arm for aligning it with said abutment and subsequent pivotal movement of the valve arm into latching engagement with said abutment as said safety valve means moves toward closed position, and liquid level responsive means for operating said safety valve means.

5. An air charger comprising, a body, a fluid passage through said body, a valve member movable to open and close the passage in response to the direction of flow of fluid in said passage, a by-pass for fluid flow around said valve member, air injecting means in said by-pass, an abutment in said passage, a latching member selectively engageable with the abutment to hold said valve member in open position, an arm pivoted on the body and adapted to move the latching member longitudinally and then laterally intto engagement with said abutment, a float, a connection between said float and the arm adapted to move the arm in response to change in position of said float.

6. An air charger assembly for a pressure tank, said assembly comprising a housing having a main liquid passage therethrough and adapted for mounting on the pressure tank, a valve member controlling said main passage, a by-pass passage around said valve member including means for injecting air into the liquid flowing through said by-pass passage, means responsive to the liquid level in the pressure tank for controlling the position of said valve member, and a relief valve spring-biased to closed position adapted to open said main passage in response to a predetermined high pressure upstream of said valve member and independently of the position of said valve member.

7. An air charger assembly for a pressure tank, said assembly comprising a housing having a main liquid passage therethrough and adapted for mounting on the pressure tank, a valve member controlling said main passage, a by-pass passage around said valve member including means for injecting air into the liquid flowing through said by-pass passage, means responsive to the liquid level in the pressure tank for controlling the position of said valve member, and a relief valve adapted to open said main passage in response to a predetermined high pressure upstream of said valve member.

References Cited in the file of this patent

UNITED STATES PATENTS 2,756,762    Nash ------------------ July 31, 1956